5 Sheets--Sheet 1.

C. CHAMBERS, Jr.

Paper Folding-Machines.

Reissued July 21, 1874.

No. 5,974.

WITNESSES

W. P. Bell

Alonzo Hughes

INVENTOR

Cyrus Chambers, Jr.

By Stansbury & Munn

Attorneys.

THE GRAPHIC CO. PHOTO-LITH. 39 & 41 PARK PLACE, N.Y.

C. CHAMBERS, Jr.

Paper Folding-Machines.

No. 5,974.

Reissued July 21, 1874.

WITNESSES

N. P. Pue

Alonzo Hughes

INVENTOR

Cyrus Chambers Jr

By Stansbury & Munn.

Attorneys.

THE GRAPHIC CO. PHOTO-LITH. 39 & 41 PARK PLACE, N.Y.

C. CHAMBERS, Jr.

Paper Folding-Machines.

No. 5,974. Reissued July 21, 1874.

WITNESSES

W. P. Dell

Alonzo Hughes

INVENTOR

Cyrus Chambers Jr

By Stansbury & Mum

Attorneys.

THE GRAPHIC CO. PHOTO-LITH. 39 & 41 PARK PLACE, N.Y.

5 Sheets--Sheet 4.

C. CHAMBERS, Jr.

Paper Folding-Machines.

No. 5,974. Reissued July 21, 1874.

WITNESSES

W. D. Bell

Alonzo Hughes

INVENTOR

Cyrus Chambers, Jr.

By Stansbury & Munn

Attorneys.

THE GRAPHIC CO. PHOTO-LITH. 39 & 41 PARK PLACE, N.Y.

C. CHAMBERS, Jr.
Paper Folding-Machines.
No. 5,974. Reissued July 21, 1874.
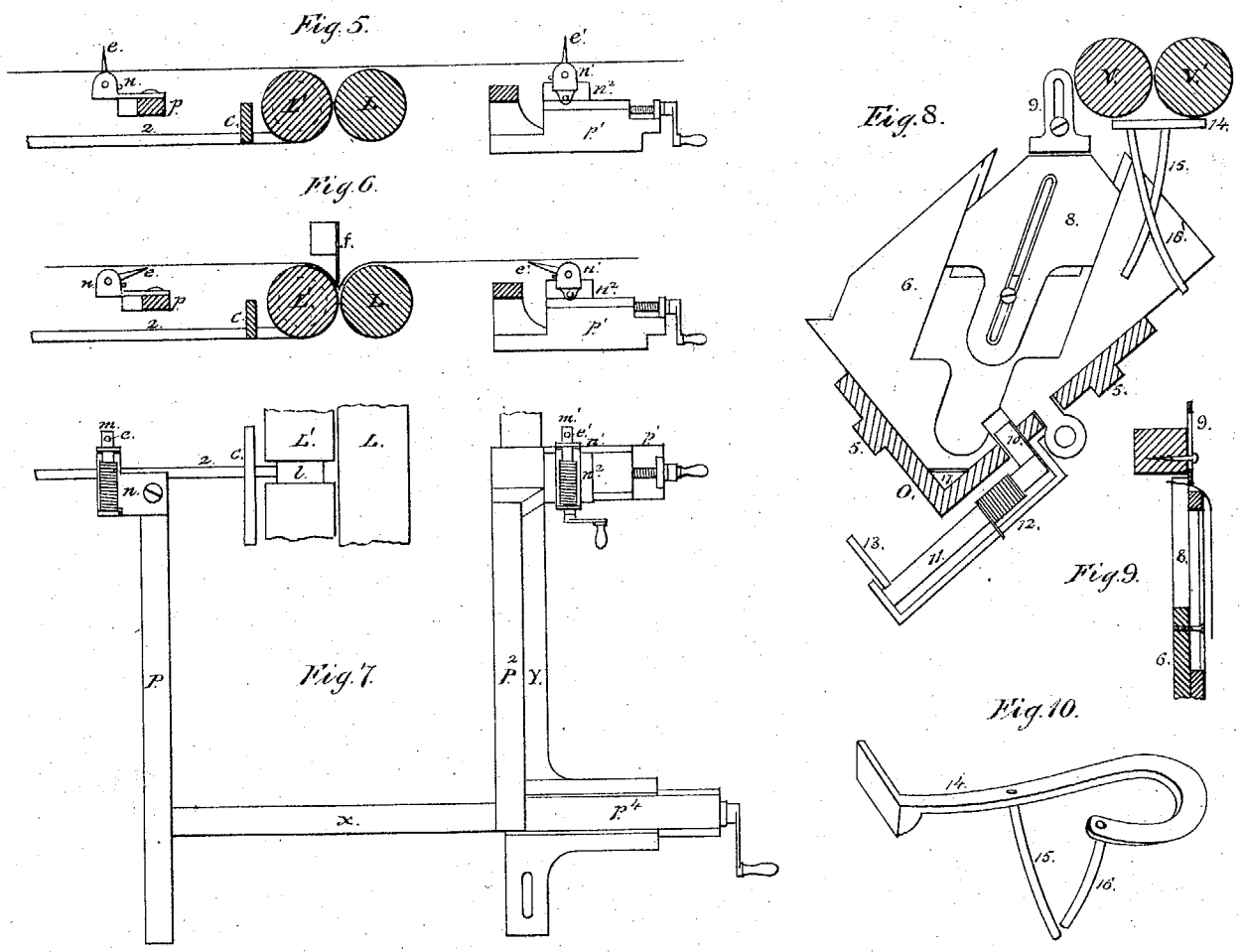
WITNESSES
N. P. Pell
Alonzo Hughes
INVENTOR
Cyrus Chambers Jr
By Stansbury & Munn
Attorneys.
THE GRAPHIC CO. PHOTO-LITH. 39 & 41 PARK PLACE, N.Y.

UNITED STATES PATENT OFFICE.

CYRUS CHAMBERS, JR., OF PHILADELPHIA, PENNSYLVANIA.

IMPROVEMENT IN PAPER-FOLDING MACHINES.

Specification forming part of Letters Patent No. 23,445, dated April 5, 1859; extended seven years; reissue No. 5,974, dated July 21, 1874; application filed June 2, 1874.

*To all whom it may concern:*

Be it known that I, CYRUS CHAMBERS, Jr., of the city and county of Philadelphia and State of Pennsylvania, have invented certain new and useful Improvements in Paper-Folding Machines; and I do hereby declare the following to be a full and correct description of the same, reference being had to the accompanying drawings, in which—

Figure 1:
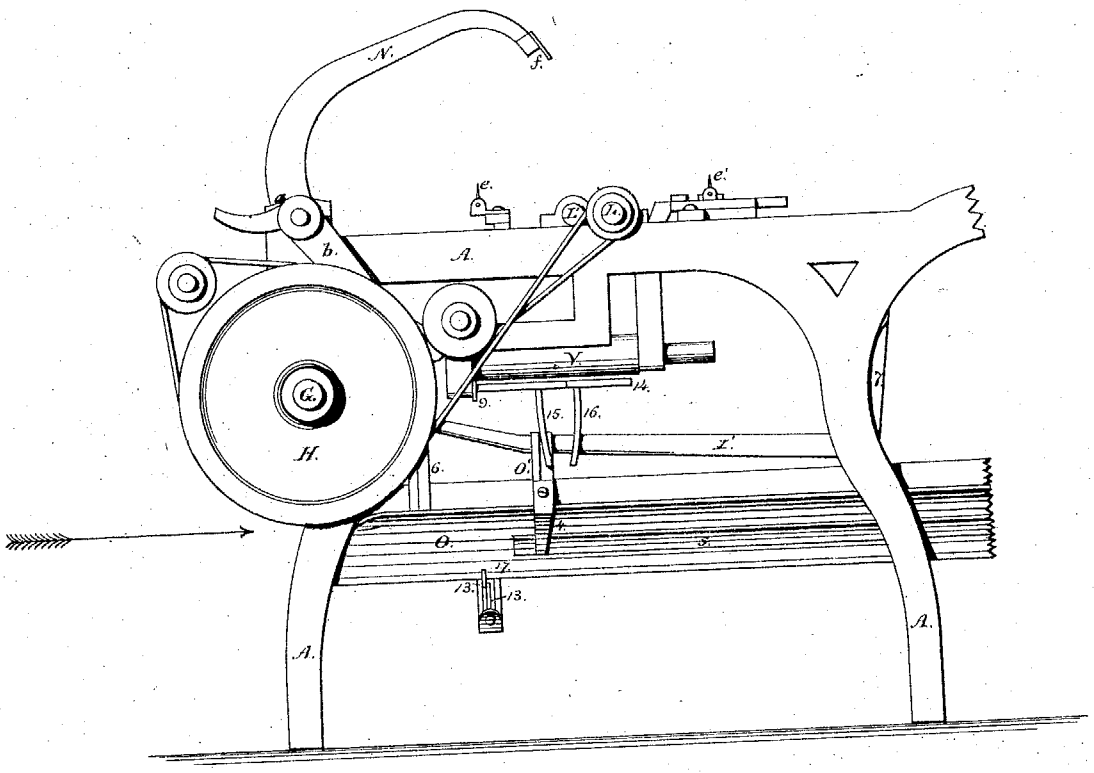
Figure 2:
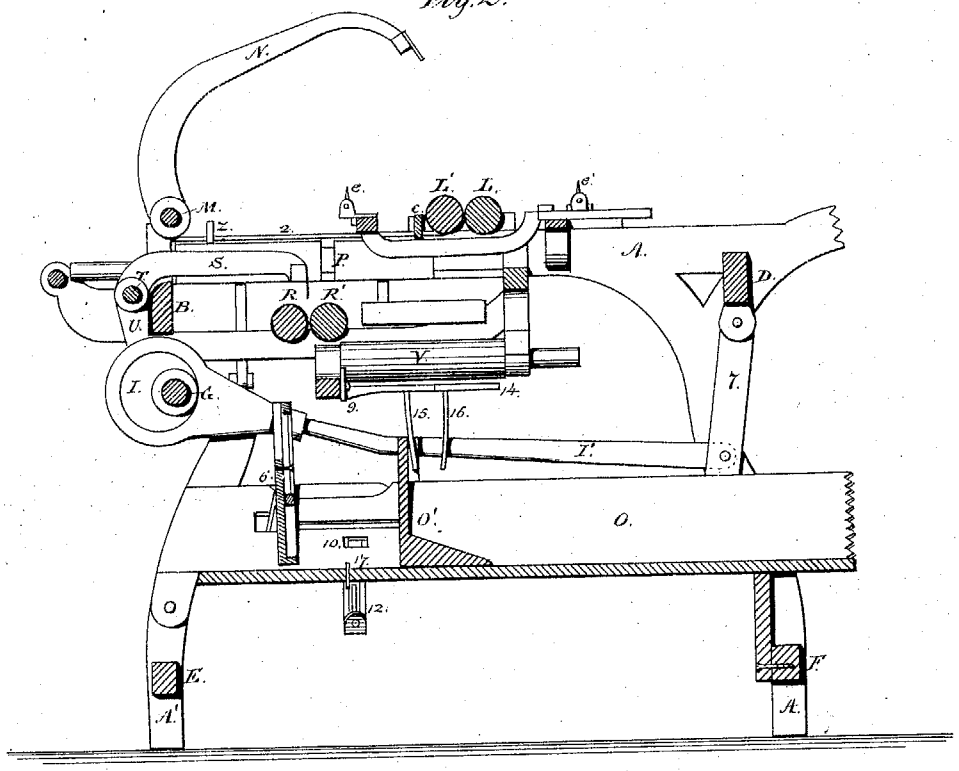
Figure 3:
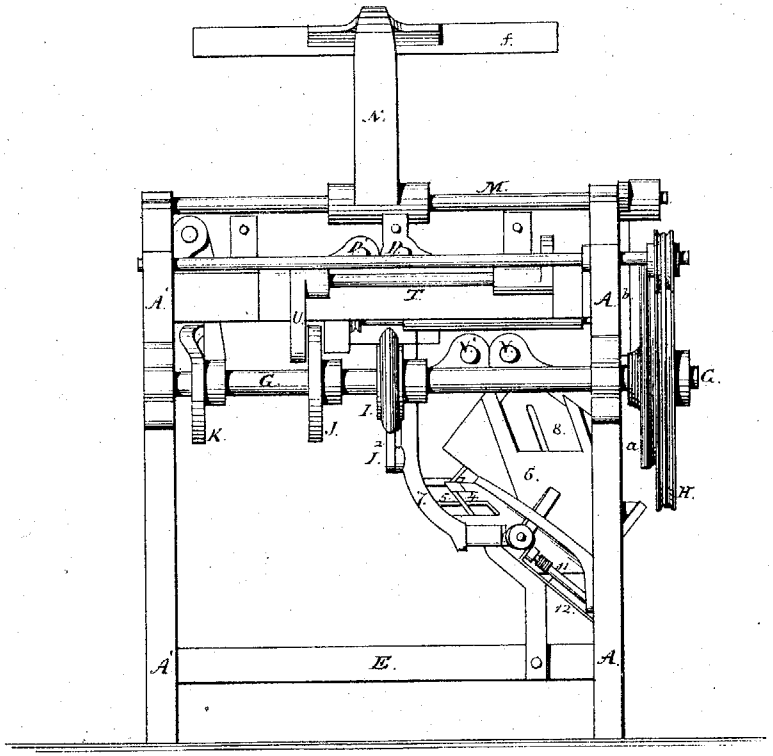
Figure 4:
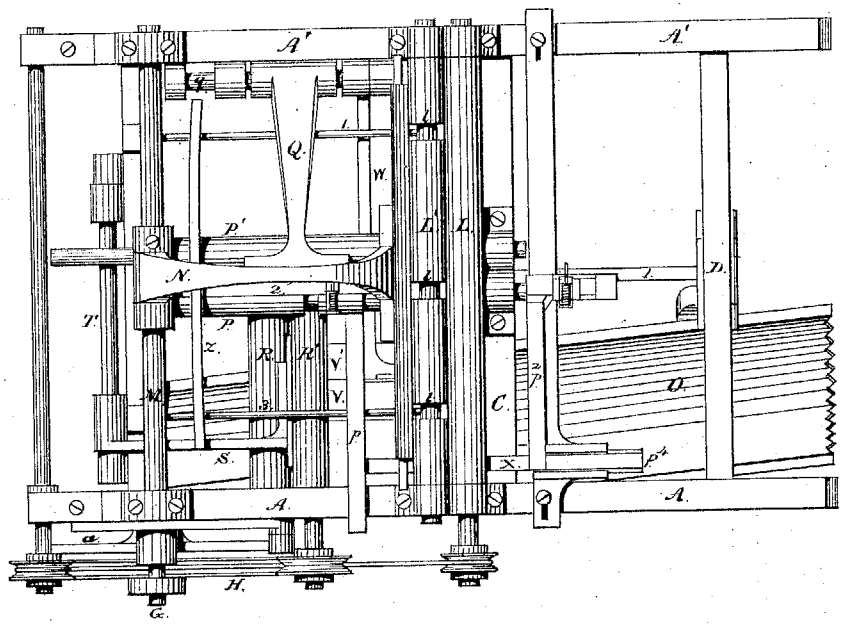

Figure 1 is a side elevation of a paper-folding machine with my improvements. Fig. 2 is a sectional elevation of the same; Fig. 3, an end view, looking in the direction of the arrow, Fig. 1; Fig. 4, a ground plan; Figs. 5 and 6, enlarged sectional views of the registering device; Fig. 7, a plan of Figs. 5 and 6; Figs. 8 and 9, detached views illustrating part of the packing arrangement; Fig. 10, a perspective view of the device for changing the position of the folded sheets prior to their entering the packing-trough.

Similar letters refer to similar parts wherever they occur.

My invention relates to improvements in the paper-folding machine for which Letters Patent of the United States were granted to me on the 7th day of October, 1856, and on the 3d day of November, 1857; and my improvements consist, first, in register-pins, so constructed and attached to a paper-folding machine that they will maintain their proper erect position for entering the holes in the sheet, for the adjustment of the latter, and yield by the inward movement of the sheet, so as to release without tearing it, in the manner hereinafter described; second, in adjusting the two pins simultaneously, both laterally and longitudinally, by means of the frames hereinafter described, or their equivalents, one frame being adjustable in one direction on the other frame, and the two frames being jointly adjustable in another direction on the frame of the machine, or on any other suitable attachment thereto; third, in introducing the ends of any convenient number of rods, terminating at one of the folding-rollers into grooves cut in said rollers to receive them, for the purpose hereinafter stated; fourth, in an adjustable stop, having its inner edge made in a curved or angular form, or otherwise so constructed that the convex folded edge of the sheet shall come in contact with the concave surface of said stop, as and for the purpose hereinafter explained; fifth, in the combination, with a packing-plunger, of two adjustable plates so arranged as to adapt the plunger to the packing of sheets of different sizes, as hereinafter set forth; sixth, in a yielding spring-catch projecting into the packing-trough through a slot in the same, and operated by the passing of the folded sheet into the trough, so as to assist in preventing the return of said sheet, and also to impart motion to a counting or indicating apparatus, as hereinafter more fully specified; seventh, in the combination, with a paper-folding machine, of an alarm or indicating apparatus, operated by a sheet passing from the machine after being perfectly-folded by it, so that none but perfectly folded sheets shall be counted by the said apparatus; eighth, in causing a sliding board, against which the sheets are packed in the folding-trough, to move along the latter with a friction diminishing as the sheets accumulate, by means of springs attached to said sliding board, and caused to react against long wedge-formed or inclined strips with a constantly-lessening force as the board moves back in the trough.

To enable others to make and use my invention, I will now proceed to describe its construction and operation.

In the accompanying drawings, A and A′ are the opposite side frames of the machines, and are connected together by the upper transverse bars B, C, and D, and the lower bars E and F, Fig. 2. G is the main cam-shaft, on which is secured a pulley, H, on the back of which is a cam, *a*, both situated outside the frame. To the shaft G are also secured an eccentric, I, and cams J and K. To the top of the frames A and A′ are secured suitable boxes, in which turn the journals of the first pair of folding-rollers L L′, the journals of the roller L projecting beyond the frame having on its end a pulley driven by a band or cord from the main pulley H of shaft G. To the frames are also attached two boxes for the shaft M, to which is secured an arm, N, on the end of which is a metal blade, *f*, whose edge, when depressed, coincides with the line of contact of the two rollers L and L′, as best shown in Fig. 6. The alarm N is operated by the cam *a* at the back of the pulley H, the said cam bearing against a roller on the end of the arm *b* secured to the shaft M. P and P′, Figs. 2 and 4, are the second pair of folding-rollers, turning in boxes secured to the cross-bars B and C of the frame. The edge of a blade on an arm, Q, coincides when depressed with the line of contact of the rollers P P′. The arm *a* is attached to shaft *q*, which turns in bearings attached to the inside of frame A, an arm on this shaft being operated by the cam K on the driving-shaft G. R and R′ are the third pair of folding-rollers placed at right angles to the second pair, and turning in boxes attached to the frame. The edge of a blade on the end of the arm S coincides, when the blade is depressed, with the line of contact of the two rollers R R′, and this arm is secured to a shaft, T, which turns in boxes on the transverse bar B of the frame, an arm, U, on the said shaft being operated by the cam J on the driving-shaft G. V and V′ are the fourth and last pair of folding-rollers, hung to the frame of the machine, and turned by any suitable system of gearing. Above these rollers is a blade on the end of the arm W, which is secured to the shaft *q*, the latter being, as before stated, operated by cam K on shaft G.

The system of tapes or bands used in connection with the above-described rollers is similar and similarly arranged to that described in my patent granted October 7, 1856.

Two register-pins, *e* and *e′*, are situated one on each side of the first pair of rollers L and L′. Each pin is secured to a spindle—the pin *e* to the spindle *m* and the pin *e′* to the spindle *m′*. (See Fig. 7.) The spindle *m* turns in a bracket, *n*, secured to a bar, *p*, which forms a part of the frame X. The spindle *m′* turns in a bracket, $n^1$, which is arranged to slide transversely across the machine in a block, $n^2$, the latter being arranged to slide longitudinally with the machine in a projection, $p^1$, on the bar $p^2$, which also forms a part of the frame X. A projection, $p^4$, from this frame is arranged to slide longitudinally in a projection on the bar Y, the opposite ends of which rest on and are so secured to the opposite frames A and A′ of the machine that the bar can be readily adjusted transversely, but can have no movement in the direction of the length of the machine. It will now be seen that the entire frame X, with its register-pins *e* and *e′*, may be adjusted both laterally and longitudinally, and the position of the pins relatively to the rollers altered at pleasure. The position of the pins, too, in relation to each other, can be readily adjusted laterally and longitudinally by the arrangement of slides already described as being connected with the spindle *m′*. Each of the spindles *m* and *m′* has a spiral spring coiled round it, one end of the spring being attached to the bracket in which the spindle turns, and the other end to the spindle itself. The tendency of the spiral springs is to maintain the register-pins in the vertical position shown in Fig. 5, beyond which they are prevented from moving outward by a pin projecting from the spindle, and bearing against the bracket in which it turns, or by any other suitable stopping device. The register-pins, however, can be depressed so as to move toward the rollers, as seen in Fig. 6, but instantly recover their vertical position on the removal of the depressing force.

It will be observed, on reference to Figs. 4 and 7, that the roller L′ has three grooves, *l l l*, and that into each groove projects the end of one of the rods 1, 2, and 3, which are secured by their farther end to the transverse bar B of the frame, and at the end nearest the rollers are supported by a cross-bar, *c*. The ends of the rods coincide nearly with a line drawn perpendicularly through the center of the roller L′, the under side of the rods being level, or thereabout, with the under side of the roller. On the rods 1, 2, and 3 is an adjustable bar, *z*, Fig. 4, which forms the stop which arrests the sheet of paper after it has received its first fold. The inner face of this bar or stop, with which the folded edge of the once-folded sheet is brought in contact, is not straight, but of such a curved or angular form, that its surface at the ends is nearer to the roller than the surface at the middle. O is the packing-trough, the opposite ends of which are secured to the end of the frame of the machine, and which is of the angular form represented in the enlarged transverse sectional view, Fig. 8. In the trough is a sliding board, O′, Figs. 1 and 2, to which are secured two springs, 4, one spring overlapping one side and the other overlapping the opposite side of the trough, and each spring bearing against a strip, 5, secured to the side of the trough. Each strip 5 is made in the form of a wedge, increasing in thickness from the outer end of the trough to the point where it terminates. The springs 4, bearing against these wedge-formed or inclined strips, tend by their friction to retard the motion of the sliding board O′, and as the friction is greater where the thickest portion of the strips presents itself than at the end at the trough where the strips are thinner, the board will move more readily in the trough as it approaches its rear end. Another board or plunger, C, also slides in the trough. A projection from said plunger passes through a slot in the trough, and is connected by means of a rod to the lower end of the arm 7, which is hung loosely to lugs on the under side of the transverse bar D of frame. To this arm is connected one end of the rod I′, the opposite end of which is strapped to the eccentric I on the shaft G, the rotating of the latter imparting a vibrating motion to the arm 7 and a reciprocating motion to the plunger C. The latter is provided with an adjustable plate, 8, which can be raised and lowered at pleasure. To a permanent part of the frame is attached a plate, 9, Figs. 1, 2, and 8, so arranged as to be readily raised and lowered. A tongue or catch, Fig. 8, which is secured to or forms a part of the spindle 11, projects through an opening in the trough, the spindle 11 turning in a bracket, 12, secured to the under side of the trough. A spiral spring surrounds the spindle 11, and tends to maintain the tongue or catch 10 in a vertical position, with its point projecting a short distance into the trough, when not depressed by the edge of a passing folded sheet, as hereinafter described. A pin or arm, 13, projecting from the spindle 11 may be attached to and made to operate any suitable registering or alarm apparatus for indicating the entrance of a folded sheet into the packing-trough, and recording the number of sheets which have been perfectly folded and packed. The tongue 10, after the passage of the folded sheet into the packing-trough, rises and assists in preventing the return of the packed sheet with the plunger. There is a notch or recess in the plunger to enable it to clear the catch 10 on the backward stroke of the plunger. Immediately under the last pair of folding-rollers V and V′, and to a permanent part of the frame, is secured a bent bracket, 14, the form of which will be best observed on reference to Fig. 10. From this bracket, and immediately over the trough, project two wires, 15 and 16, which are bent in a peculiar form, and the purpose of which will be fully set forth hereafter. It should be understood that the machine is covered at the top by a flat plate or table for receiving the sheet to be folded. The register-pins project up through this plate, which is provided with an opening for them, and for the play of the folding-blade on arm N. Before the machine is started the register-pins are adjusted to correspond with the holes previously made in the paper by points in the form during the process of printing. This adjustment may be readily accomplished by adjusting the frame X on the bar Y, by adjusting the latter on the main frame, as well as by adjusting the latter on the projection $p'$ of the frame X. Ample means are thus afforded for altering the position of the register-pins, in relation to the first and second pair of folding-rollers, as well as in relation to each other, and retaining them when adjusted. The stop Q must also be adjusted to a proper position to hold the sheet square for the second and in proper position for the third, fold before the machine is put in operation. On turning the driving-shaft G a revolving motion toward each other will be imparted to each of the four pairs of folding-rollers, and a reciprocating motion to the several folding-blades, by which the paper is forced between the rollers, as described in my patent of October 7, 1856. At the same time a reciprocating motion will be imparted to the plunger C in the trough O. The sheet of paper to be folded being placed by the operator on the cover of the machine in such a position that the register-pins $e$ and $e'$ shall fit in the holes made in the paper by the press points during the process of printing, the blade $f$ on the arm N, which is furnished with a number of needles inserted in its edge, descends suddenly on the sheet, creases it, and forces the creased edge between the first pair of folding-rollers L and L′. As the blade is in the act of creasing the paper the two ends of the sheet must be drawn toward each other, and consequently the register-pins $e$ and $e'$, were they to remain in their vertical position, would cause the paper to be so torn as to be unfit for use. The spiral springs, however, which surround the spindles $m$ and $m^1$, to which the pins are attached, are of such delicacy that, while they tend to maintain the pins in a vertical position, they still allow them, instantly, to yield and assume the position shown in Fig. 6, by the mere inward movement of the paper, unaided by any mechanical appliances. As the pins fall to this position they leave the holes in the paper, and as the latter, by the action of the rollers, is being drawn between them and folded the paper will pass over the pins without receiving any injury from them. As soon as the paper has been released by the pins they recover their vertical position preparatory to receiving another sheet of paper and presenting it, under the first folding-blade, to the first pair of folding-rollers. As the once-folded sheet passes between the latter it is directed by a system of tapes or bands (so fully described in my former patent as to need no explanation here) toward the second pair of folding-rollers, the folded sheet being arrested by the stop $z$, Fig. 4, against which the folded edge bears, and by which it is presented in its proper position to receive the second fold. During this part of the operation—that is, from the time the sheet is leaving the first pair of folding-rollers until it is about to receive the second fold—there are two points at which, in my previously patented machine, the sheet was liable to be so operated upon as to become defective. One point was that where the folded edge of the sheet, after leaving the first pair of folding rollers, comes in contact with the tapes or bands, and, being bent by the latter, was apt, as the sheet passed on, to continue the bend and curl up, following the direction of the periphery of the roller L′. The other point where a defect might originate, supposing the first point to have been passed in safety, was where the folded edge comes in contact with the stop $z$, when that edge, owing to the warping or buckling of the paper, is not quite straight. The means of preventing any defects from arising at these two points form a special feature in my present improvements.

It has been already observed that the rods 1, 2, and 3 pass into grooves $l$ cut in the roller L′; that the rods terminate at or about a line drawn perpendicularly through the center of that roller, and that the under side of the rod is level, or thereabout, with the under side of the rollers. Now, on referring to Fig. 6 and noting the position of these rods, it will be seen that it will be impossible, in my present machine, for the folded edge of the sheet, as it passes from the rollers, to turn up and follow the direction of the roller L′, as the rods present a bar to prevent this, and serve to guide the sheet safely past this danger. Occasionally, through the warping or buckling of the paper, the first fold will present an edge slightly rounded. Should the stopping-bar *z* be straight, and the rounded edge of a sheet be brought in contact with it, there would be no certainty of that sheet being held in its proper position to receive the second fold. In other words, as the rounded edge of a sheet is forced against a straight-edged stop the sheet has an opportunity to assume a variety of positions, and to come to rest at an angle to the stop, or at an angle to the second pair of folding-rollers. In such a case the second fold accomplished by these rollers would not be at right angles to the first fold, and should this second fold be, even but a trifle, out of its proper angle, the third fold would be still farther out of truth, and the same with the last fold. The folded sheet would be thus so imperfect as to be unfit for binding. Hence the importance of giving the inner face of the stop *z* a concave or angular form, so that the rounded folded edge of the sheet can come in contact with it in more than one point, so that the sheet shall be steadily held. When the stop is thus formed, the rounding of the edge which is always found in a folded sheet will not cause the sheet to rock, as it would if it came in contact with a straight-edged stop, and will in no way prevent the assumption by the folded sheet of the proper position against the stop, for receiving the second fold. The second fold is accomplished by the blade on the end of the arm Q creasing the sheet and forcing it between the rollers P and P′, the third fold by a blade on the arm U forcing the paper between the rollers R and R′, and the fourth and last fold by a blade on the arm W forcing the paper between the rollers V and V′. The fourth fold, however, is not always required, in which case the bands for directing the sheets to these rollers are thrown off, and the folded sheet falls into the trough O, between the sliding board O′ and the reciprocating-plunger C.

In the machine as shown in Figs. 1 and 2, the last pair of rollers is not supposed to be in use. At the time the thrice-folded paper falls into the trough, the reciprocating plunger C, Fig. 2, has, through the action of the eccentric, been moved to the limit of its backward movement. As soon as the sheet has been fairly deposited in the trough, however, the plunger C moves forward and pushes it against the body of previously-folded sheets, which bear against the sliding board O′. The adjustable plate 9 and the tongue 10 have been previously referred to. This plate and tongue, as will be seen in Fig. 2, are in the same vertical plane. Now, the plunger C moves just far enough forward to push the folded sheet a short distance past the tongue and plate. The upper corner of the folded sheet will consequently be pressed down, as seen in Fig. 9, the top of the adjustable plate 8, of the plunger being the point where the bend at the corner of the sheet will take place. At the same time the yielding tongue or catch 10 will be forced down by the advancing sheet. After the corner of the sheet has passed the lower edge of the plate 9, and after the edge of the sheet has passed the point of the depressed tongue 10, and the lower corner over an angular strip, 17, in the corner of the trough, the upper corner of the sheet will recover from the bend, and spring back to the upright position. At the same time the plunger will recede, the tongue 10 will be elevated, and, together with the strip 17, prevent the return of the lower end of the sheet, while the upper end is prevented from returning by the plate 9. Thus the folded sheet becomes one of the body previously folded and confined between the sliding board O′ on one side and the tongue 10, strip 17, and plate 9 on the other side, while the plunger recedes preparatory to forcing another folded sheet forward and adding it to the body thus collected in the trough.

As before stated, a notch or recess in the side of the plunger allows it to clear the catch 10 on its return stroke, when the latter is in an erect position. As every folded sheet in succession is added to the pack in the trough, the sliding board O′ moves back a short distance along the trough, and this movement is retarded by the springs 4, Fig. 1, each of which, as before remarked, bears against one of the inclined strips 5, situated on each side of the trough. This retarded motion causes the plunger to pack and compress the folded sheets into a compact mass. In order that they may be compressed to an equal density throughout, it is necessary that the friction of the board O′ against the side of the trough should be removed as the mass of folded sheets accumulates, inasmuch as the weight of the folded sheets, and their constant increase of bulk, of themselves add to the friction which no longer requires to be artificially increased. In order to diminish the friction of the sliding board, the strips 5, on the outside of the box, are made of the wedge shape or taper form already described, so that, as the board approaches the rear end of the trough, the springs pass over an inclined plane, and, consequently the amount of their compression by the strips and, of course, their reaction and friction against them, are decreased. An uniform compactness of the whole mass of sheets contained in the trough is thus obtained.

It is desirable that the attendant should be made aware, or should be able readily to ascertain, without counting, the number of perfectly-folded sheets contained in the trough, so that they may be removed in masses containing a specific number, thereby facilitating the subsequent operations through which the sheet must pass preparatory to binding. An indicating apparatus, connected with or driven by any of the regularly-moving parts of the machine, would not perform this duty with precision, inasmuch as some of the sheets, which are found to be imperfect after they have been adjusted to the register-pins, are, by means of a device described in my former patent, thrown out of the machine as they are receiving their last fold, and do not enter the packing-trough, and, moreover, the machine is sometimes allowed to run without being fed at every stroke. The spindle 11, to which the tongue 10 is attached, or of which it forms a part, projects beyond the trough, and is furnished with a projecting pin or arm, 13, which may be connected with any suitable indicating and alarm apparatus. As the spindle is turned backward and forward once only on the accession of every newly-folded sheet to the mass contained in the trough, and as these sheets are all perfectly folded, it is evident that an indicator, operated by this spindle, must point out accurately the number of sheets contained in the trough.

When the last pair of folding-rollers V and V′ is used, so as to complete a fourth fold of the sheet, it is evident that as they are in a line, or thereabout, with the trough, the folded sheets must be turned a quarter round, or the packing arrangement above described could not be used. This difficulty is overcome by the bracket 14, and its curved wires 15 and 16, represented in Fig. 10. These wires are placed directly under the last pair of rollers, and are so bent and situated in relation to the trough that, as the sheet passes from between the rollers, it comes in contact with the wires, the peculiar bend of which turns the sheet a quarter round, so that, instead of falling with its edge in a line with the trough, which but for this provision it would do, it falls in a plane at right angles to the line of the trough, precisely in the same manner as the sheet falling from the third pair of folding-rollers.

When the fourth pair of folding-rollers is used the plunger C should be so adjusted on the rod, by which it is connected to the vibrating arm 7, as to be nearer to the wires 15 and 16 than it is represented to be in Fig. 2.

As sheets of various sizes are folded in the machine, it is evident that the plate 9, by which the upper corner of the folded sheet is bent over the plate 8 of the plunger C, as well as the plate 8 itself, should be made adjustable, so as to be readily adapted to sheets of different sizes.

It will be observed, on reference to Fig. 8, that both of these plates have slots through which the screws which secure them to their proper positions pass, so that they can be readily adjusted to suit the different sizes of the sheets.

Having now described the construction and operation of my improvements, what I claim, and desire to secure by Letters Patent, is—

1. The register-pins *e* and *e′*, so constructed and so attached to a paper-folding machine that they shall maintain the upright position proper for the adjustment of the sheet while stationary, and yet readily yield by the movement of the sheet under the operation of the folding-blade, as described.

2. The register-pins *e e′*, made simultaneously adjustable either laterally or longitudinally, or both, by the frames X and Y, the frame X being adjustable in one direction on the frame Y, and the latter, together with the frame X, being adjustable in another direction on the frame of the machine, or any other attachment thereto.

3. Folding-rollers having grooves cut in them for the reception of the ends of any convenient number of rods 1, 2, and 3, terminating at said rollers, as and for the purpose specified.

4. The adjustable stop *z*, with its inner edge of a concave or angular form, in order that the curved folded edge of the sheet shall be in contact with the said stop at more than one point for the purpose of preventing the rocking of the sheet throwing it out of register, as specified.

5. The plunger C, with its adjustable plate 8, in combination with the adjustable plate 9, the said plate being arranged substantially as and for the purpose herein set forth.

6. The combination of an alarm or indicating apparatus with a paper-folding machine, when the said indicator is operated by a sheet folded by the machine.

7. The sliding board O′, caused to move along the packing-trough with a diminution of friction as the folded sheets accumulate by means of the springs 4 attached to the said board, and arranged to bear against the wedge-formed or inclined strips 5, substantially as herein set forth, and for the purpose specified.

8. A register-pin which stands erect for the reception of a sheet of paper, and which, when said sheet is moved so as to draw upon the pin in the direction of its passage to the machine or press, yields automatically to said traction and releases the sheet, in the manner described.

9. The combination of the pin *e*, spring-wound spindle *m*, and bracket *n*, the whole forming a yielding register-pin, constructed and operating as and for the purpose set forth.

10. The combination, with the packing-trough of a folding-machine, of the tongue 10, spring-wound spindle 11, bracket 12, and arm 13, all constructed and arranged as described, and constituting a device for operating a registering mechanism in the manner set forth.

11. The spring-catch 10, projecting into the packing-trough and operated by the passing of the folded sheet, in the manner and for the purpose described.

12. The combination of the spring-catch 10 and the plunger C, having a recess cut into it to enable it to clear the catch on the return stroke of the plunger, as specified.

The above specification of my said invention signed and witnessed at Philadelphia this 30th day of May, A. D. 1874.

CYRUS CHAMBERS, JR.

Witnesses:

SANFORD W. LASOR,
JAMES MENDHAM.